T. E. BUTTON.
Hose and Pipe-Couplings.

No. 137,823.

Patented April 15, 1873.

Witnesses:
A. Bennerkendorf.
C. Sedgwick

Inventor:
T. E. Button
per Munn & Co.
Attorneys.

UNITED STATES PATENT OFFICE.

THEODORE E. BUTTON, OF WATERFORD, NEW YORK, ASSIGNOR TO HIMSELF AND L. BUTTON, OF SAME PLACE.

IMPROVEMENT IN HOSE AND PIPE COUPLINGS.

Specification forming part of Letters Patent No. 137,823, dated April 15, 1873; application filed January 11, 1873.

*To all whom it may concern:*

Be it known that I, THEO. E. BUTTON, of Waterford, in the county of Saratoga and State of New York, have invented a new and useful Improvement in Pipe or Hose Coupling, of which the following is a specification:

The invention consists in the improvement of pipe or hose couplings, as hereinafter described and pointed out in the claim.

Figure 1:
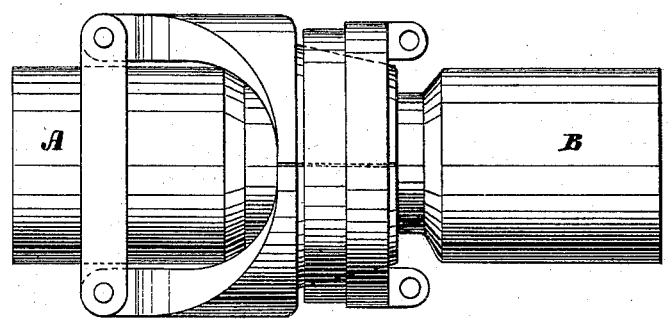
Figure 2:
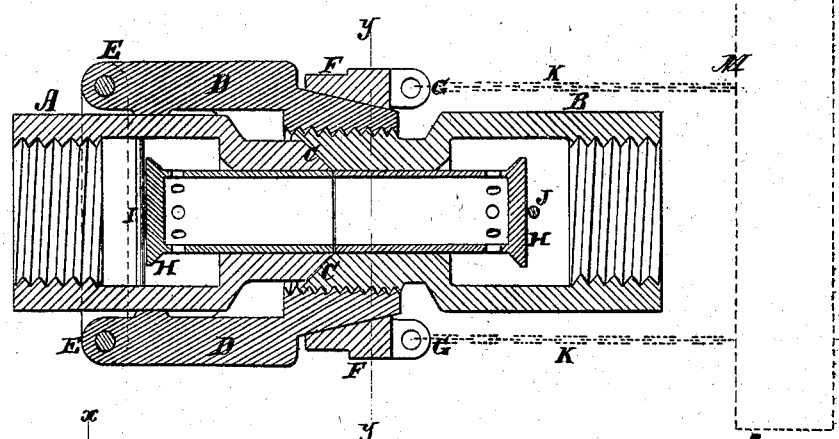
Figure 3:
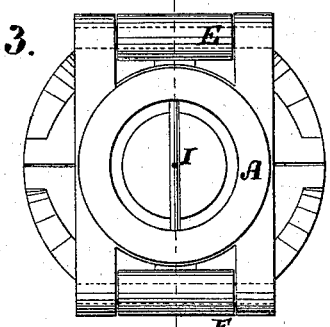
Figure 4:
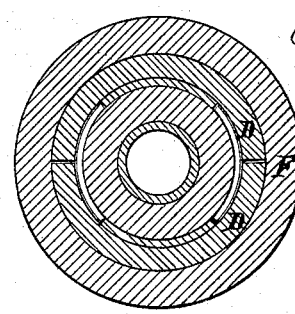

In the drawing, Figure 1 is an outside view, showing the coupling. Fig. 2 is a horizontal central section in the line $x\ x$ of Fig. 1. Fig. 3 is an end view. Fig. 4 is a section of Fig. 2 taken in the line $y\ y$.

Similar letters of reference indicate corresponding parts.

A and B are the pipes to be connected by the coupling. C is the joint where the two pipes are connected. This may be either a ground or a packed joint. D is a nut made in two parts, each part being hinged to opposite sides of the pipe A, as seen at E E. These sections may be hinged to a swivel working on the pipe A. The pipe B screws into this sectional nut, as seen in Fig. 2, which draws the pipes together. The two parts of the nut D are held together by the ring F, which is made to fit the conical surface of the outside of the nut. The taper of this surface must be sufficient to allow the ring F to be easily pulled off. The ring is provided with lugs G G, to which are attached chains K K, which are made fast to some fixture, as M.

Now, by a slight movement of either the coupling or the fixture M, the ring is pulled off and the coupling disconnected. Each pipe is provided with a pressure-valve, H. When the pipes are connected these valves are open, as seen in Fig. 2; but when the pipes are separated they close automatically or by the pressure.

My invention is useful in the connections between a steam fire-engine boiler and its stationary heater, where the starting of the engine toward the street will disconnect my coupling; or in the Westinghouse air-brake, where the pulling apart of two cars after being uncoupled, will disconnect my coupling; or in any place where the connection requires to be strong to resist internal pressure, and yet to pull apart easily when the parts connected are moved from each other.

Having thus described my invention, I claim as new and desire to secure by Letters Patent—

The combination, in a pipe or hose coupling, of the hinged sectional screw D and binding ring F, substantially as and for the purpose hereinbefore described.

THEODORE E. BUTTON.

Witnesses:
   T. B. MOSHER,
   C. SEDGWICK.